United States Patent
Siddiqi et al.

(10) Patent No.: US 7,362,742 B1
(45) Date of Patent: Apr. 22, 2008

(54) METHODS AND APPARATUS FOR SYNCHRONIZING SUBNET MAPPING TABLES

(75) Inventors: Waseem A. Siddiqi, Santa Clara, CA (US); Arunkumar B. Thippeswamy, Cupertino, CA (US); Tai Y. Yu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1028 days.

(21) Appl. No.: 10/354,690

(22) Filed: Jan. 28, 2003

(51) Int. Cl.
*H04J 3/06* (2006.01)
*H04L 12/56* (2006.01)

(52) U.S. Cl. .................. 370/350; 370/395.31
(58) Field of Classification Search ............... 370/328, 370/350, 395.31
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,473,599 A | 12/1995 | Li et al. | |
| 5,490,139 A | 2/1996 | Baker et al. | |
| 5,570,366 A | 10/1996 | Baker et al. | |
| 5,572,528 A | 11/1996 | Shuen | |
| 5,619,552 A | 4/1997 | Karppanen et al. | |
| 5,729,537 A | 3/1998 | Billstrom | |
| 5,751,799 A | 5/1998 | Mori | |
| 5,805,702 A | 9/1998 | Curry et al. | |
| 5,825,759 A | 10/1998 | Liu | |
| 5,862,345 A | 1/1999 | Okanoue et al. | |
| 5,978,672 A | 11/1999 | Hartmaier et al. | |
| 6,016,428 A | 1/2000 | Diachina et al. | |
| 6,055,236 A | 4/2000 | Nessett et al. | |
| 6,061,650 A | 5/2000 | Malkin et al. | |
| 6,075,783 A | 6/2000 | Voit | |
| 6,078,575 A | 6/2000 | Dommety et al. | |

(Continued)

FOREIGN PATENT DOCUMENTS

EP 0924913 A1 6/1999

(Continued)

OTHER PUBLICATIONS

Helmy et al., "Efficient Micro-Mobility using Intra-Domain Multicast-Based Mechanisms (M&M)", ACM SIGCOMM Computer Communications Review, vol. 32, No. 5: Nov. 2002, pp. 61-72, XP-002279254.

(Continued)

*Primary Examiner*—Kwang Bin Yao
*Assistant Examiner*—Tung Q. Tran
(74) *Attorney, Agent, or Firm*—Beyer Weaver LLP

(57) ABSTRACT

Methods and apparatus for enabling mobility of a node that does not support Mobile IP through synchronization of access point information (e.g., subnet mapping tables) among AAPs are disclosed. In accordance with one embodiment, an authoritative access point (AAP) maintains access point information for all functioning access points (APs) and sends updates for all additions or other modifications to the continually changing access point information to other AAPs. This is accomplished by sending a copy of its local subnet mapping table to the other AAPs. The AAPs receiving the subnet mapping table then update their subnet mapping tables corresponding to the received subnet mapping table.

27 Claims, 6 Drawing Sheets

U.S. PATENT DOCUMENTS

| | | |
|---|---|---|
| 6,079,020 A | 6/2000 | Liu |
| 6,081,507 A | 6/2000 | Chao et al. |
| 6,122,268 A | 9/2000 | Okanoue et al. |
| 6,131,095 A | 10/2000 | Low et al. |
| 6,137,791 A | 10/2000 | Frid et al. |
| 6,144,671 A | 11/2000 | Perinpanathan et al. |
| 6,154,839 A | 11/2000 | Arrow et al. |
| 6,163,843 A | 12/2000 | Inoue et al. |
| 6,167,513 A | 12/2000 | Inoue et al. |
| 6,172,986 B1 | 1/2001 | Watanuki et al. |
| 6,173,399 B1 | 1/2001 | Gilbrech |
| 6,175,917 B1 | 1/2001 | Arrow et al. |
| 6,195,705 B1 * | 2/2001 | Leung ............... 709/245 |
| 6,226,748 B1 | 5/2001 | Bots et al. |
| 6,226,751 B1 | 5/2001 | Arrow et al. |
| 6,230,012 B1 | 5/2001 | Willkie et al. ............... 455/435 |
| 6,240,089 B1 | 5/2001 | Okanoue et al. |
| 6,256,300 B1 | 7/2001 | Ahmed et al. |
| 6,272,129 B1 | 8/2001 | Dynarski et al. ............ 370/356 |
| 6,308,267 B1 | 10/2001 | Gremmelmaier ............ 713/168 |
| 6,339,830 B1 | 1/2002 | See et al. |
| 6,377,982 B1 | 4/2002 | Rai et al. |
| 6,393,482 B1 | 5/2002 | Rai et al. |
| 6,396,828 B1 | 5/2002 | Liu ............... 370/352 |
| 6,400,722 B1 | 6/2002 | Chuah et al. |
| 6,445,922 B1 | 9/2002 | Hiller et al. |
| 6,452,920 B1 | 9/2002 | Comstock |
| 6,466,964 B1 | 10/2002 | Leung et al. ............... 709/202 |
| 6,473,413 B1 * | 10/2002 | Chiou et al. ................. 370/331 |
| 6,496,491 B2 | 12/2002 | Chuah et al. |
| 6,496,855 B1 | 12/2002 | Hunt et al. ................... 709/217 |
| 6,510,144 B1 * | 1/2003 | Dommety et al. ........... 370/328 |
| 6,515,974 B1 | 2/2003 | Inoue et al. |
| 6,522,880 B1 | 2/2003 | Verma et al. |
| 6,535,493 B1 | 3/2003 | Lee et al. .................... 370/329 |
| 6,571,289 B1 | 5/2003 | Montenegro |
| 6,577,643 B1 * | 6/2003 | Rai et al. .................... 370/466 |
| 6,578,085 B1 * | 6/2003 | Khalil et al. ................ 709/241 |
| 6,587,882 B1 | 7/2003 | Inoue et al. ................ 709/227 |
| 6,625,135 B1 | 9/2003 | Johnson et al. ............. 370/332 |
| 6,651,105 B1 | 11/2003 | Bhagwat et al. ............ 709/239 |
| 6,657,981 B1 | 12/2003 | Lee et al. |
| 6,665,537 B1 | 12/2003 | Lioy ....................... 455/435.1 |
| 6,683,871 B1 | 1/2004 | Lee et al. |
| 6,684,241 B1 | 1/2004 | Sandick et al. |
| 6,707,809 B1 | 3/2004 | Warrier et al. |
| 6,742,036 B1 | 5/2004 | Das et al. ................... 709/226 |
| 6,760,444 B1 | 7/2004 | Leung |
| 6,795,857 B1 | 9/2004 | Leung et al. ............... 709/224 |
| 6,810,259 B1 | 10/2004 | Zhang |
| 6,947,401 B2 | 9/2005 | El-Malki et al. |
| 6,973,068 B2 | 12/2005 | Inoue et al. |
| 6,982,967 B1 | 1/2006 | Leung |
| 6,996,084 B2 | 2/2006 | Troxel et al. |
| 7,068,640 B2 | 6/2006 | Kakemizu et al. |
| 7,079,499 B1 | 7/2006 | Akhtar et al. |
| 7,079,520 B2 | 7/2006 | Feige et al. |
| 7,080,151 B1 | 7/2006 | Borella et al. |
| 7,130,629 B1 | 10/2006 | Leung et al. |
| 7,152,238 B1 | 12/2006 | Leung et al. |
| 7,216,159 B2 | 5/2007 | Hirose et al. |
| 7,260,638 B2 | 8/2007 | Crosbie |
| 2001/0005369 A1 | 6/2001 | Kloth |
| 2001/0036184 A1 | 11/2001 | Kinoshita et al. |
| 2002/0018456 A1 | 2/2002 | Kakemizu et al. |
| 2002/0026527 A1 | 2/2002 | Das et al. ................... 709/245 |
| 2002/0075866 A1 | 6/2002 | Troxel et al. |
| 2002/0078238 A1 | 6/2002 | Troxel et al. |
| 2002/0147837 A1 | 10/2002 | Heller |
| 2003/0123421 A1 | 7/2003 | Feige et al. |
| 2004/0001513 A1 * | 1/2004 | Major et al. ................. 370/469 |
| 2004/0024901 A1 | 2/2004 | Agrawal et al. ............ 709/238 |
| 2004/0081086 A1 | 4/2004 | Hippelainen et al. |
| 2004/0103282 A1 | 5/2004 | Meier et al. |
| 2004/0114559 A1 | 6/2004 | Wang |
| 2004/0208187 A1 | 10/2004 | Mizell et al. |
| 2004/0213260 A1 | 10/2004 | Leung et al. |
| 2006/0203804 A1 * | 9/2006 | Whitmore et al. ........... 370/352 |

FOREIGN PATENT DOCUMENTS

| | | |
|---|---|---|
| EP | 0978977 A1 | 2/2000 |
| EP | 1124396 A2 | 8/2001 |

OTHER PUBLICATIONS

C. Perkins, (Editor): "IP Mobility Support, RFC 2002," Oct. 1996, 55 pages.

*International Search Report PCT/US 03/38568*, 4 pp., mailed May 21, 2004.

*International Search Report PCT/US2004/013365*, 7 pp., mailed Oct. 5, 2004.

Release notes for 3Com Corporation, "Conducting a Redundant Route for Network Resiliency", Mar. 1994, *NET Builder Family Bridge/Router* pp. 26-29.

J. Moy, RFC 1247 "OSPF Version 2", Jul. 19, 1991.

D. Oran, RFC 1142 "OSI IS-IS Intra-domain Routing Protocol", Feb. 1990.

Uyless Black, "TCP/IP and Related Protocols", 1992, *McGraw-Hill, Inc.*, pp. 226-249.

T. Li, et al., RFC 2281 "Cisco Hot Standby Router Protocol (HSRP)", Oct. 27, 1997.

Chambless, et al., "Home Agent Redundancy Protocol (HARP)", Oct. 27, 1997.

C. Perkins, Network Working Group, RFC 2002 "IP Mobility Support", Oct. 1996.

B. Adoba, et al., Network Working Group, RFC 2486 "The Network Access Identifier", Jan. 1999.

"Mobile IP", Release 12.0(1)T, pp. 1-55.

Montenegro, G., "Reverse Tunneling for Mobile IP", RFC 2344, Sun Microsystems, Inc., pp. 1-19, May 1998.

D. Harkins and D. Carrel, "The Internet Key Exchange (IKE)", Cisco Systems, pp. 1-33, Jun. 1998.

D. Cong and M. Hamlen and C. Perkins, "The Definitions of Managed Objects for IP Mobility Support using SMIv2", RFC 2006, Motorola and IBM, pp. 1-52, Oct. 1996.

C. Finseth, "An Access Control Protocol, Sometimes Called TACAS," RFC 1492, pp. 1-15, Sep. 13, 1992.

D. Carrel and Lol Grant, "The TACACS+ Protocol", Network Working Group, Internet-Draft, Cisco Systems, pp. 1-42, Jan. 1997.

C. Rigney, "RADIUS Accounting", RFC 2139, Livingston, pp. 1-25, Apr. 1997.

C. Rigney, et al., "Remote Authentication Dial in User Service (RADIUS)", RFC 2138, pp. 1-65, Apr. 1997.

Perkins & Hobby, Network Working Group, RFC 1172 "The Point-to-Point Protocol (PPP) Initial Configuration Options," Jul. 1990.

W. Simpson, Network Working Group, RFC 1994 PPP Challenge Handshake Authentication Protocol (CHAP), Aug. 1996.

R. Droms, "Dynamic Host Configuration Protocol", RFC 2131, Mar. 1997, pp. 1-39.

Lloyd, et al., Network Working Group, RFC 1334 "PPP Authentication Protocols", Oct. 1992.

McGregor, Network Working Group, RFC 1332 "The PPP Internet Control Protocol (IPCP)", May 1992.

Simpson, ed., Network Working Group, RFC 1661, "The Point-to-Point Protocol (PPP)", Jul. 1994.

Calhoun and Perkins, "Mobile IP Network Access Identifier Extension for IPv4", Jan. 12, 2000.

Postel, J., "Simple Mail Transfer Protocol", STD 10, RFC 821, Aug. 1982.

Crocker, D. and P. Overrell, "Augmented BNF For Syntax Specifications: ABNF", RFC 2234, Nov. 1997.

Kent K. Leung, U.S. Appl. No. 09/227,399, "Mobile IP Authenticatioon", filed Jan. 9, 1999.

U.S. Office Action, mailed Nov. 24, 2006, from U.S. Appl. No. 10/080,995.

Network Working Group, RFC 2002 "IP Mobility Support," Oct. 1996, 80 pgs.

Charles Perkins, "Mobile IP Design Principles and Practices", Addison Wesley, 1998, pp. 50, 55-59, 83, 78.

U.S. Office Action dated Jun. 2, 2006 from related U.S. Appl. No. 10/080,995, 15 pgs.

U.S. Office Action dated Feb. 9, 2007 from related U.S. Appl. No. 10/080,995, 13 pgs.

U.S. Office Action dated Jul. 19, 2007 from related U.S. Appl. No. 10/080,995, 9 pgs.

U.S. Office Action dated Dec. 15, 2006 from related U.S. Appl. No. 10/321,080, 11 pgs.

U.S. Office Action dated Jul. 3, 2007 from related U.S. Appl. No. 10/321,080, 11 pgs.

U.S. Office Action dated Apr. 17, 2007 from related U.S. Appl. No. 10/426,106, 9 pgs.

U.S. Office Action dated Jun. 15, 2007 from related U.S. Appl. No. 10/426,106, 13 pgs.

U.S. Office Action dated Jun. 4, 2007 from related U.S. Appl. No. 10/874,679, 14 pgs.

US Office Action mailed Jun. 2, 2006, from U.S. Appl. No. 10/080,995, 15 pp. (CISCP263).

US Office Action mailed Dec. 15, 2006, from U.S. Appl. No. 10/321,080, 11 pp. (CISCP322).

US Office Action mailed Feb. 9, 2007, from U.S. Appl. No. 10/080,995, 13 pp. (CISCP263).

* cited by examiner

| HA IP Address | Subnet mask of the subnet that HA belongs to | # Access Points that HA supports | AP IP addresses of the Access Points that HA supports |
|---|---|---|---|
| | | | |
| | | | |
| | | | |

METHODS AND APPARATUS FOR SYNCHRONIZING SUBNET MAPPING TABLES

RELATED APPLICATIONS

This application is related to application Ser. No. 10/080,995, entitled "METHODS AND APPARATUS FOR SUPPORTING PROXY MOBILE IP REGISTRATION IN A WIRELESS LOCAL AREA NETWORK," by inventors Wang et al, filed on Feb. 20, 2002, from which priority is claimed, which is incorporated by reference for all purposes.

This application is also related to application Ser. No. 09/608,692, entitled "METHODS AND APPARATUS FOR IMPLEMENTING A PROXY MOBILE NODE IN A WIRELESS LOCAL AREA NETWORK," by inventor Kent K. Leung, filed on Jun. 29, 2000, from which priority is claimed, which is incorporated by reference for all purposes.

BACKGROUND OF THE INVENTION

1. Field of the Invention

The present invention relates to Mobile IP network technology. More particularly, the present invention relates to enabling mobility for a node that changes its location within a network through the use of control messages that are sent and received by access points.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4. Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

It is often desirable to assign a unique IP address to each user or device within a network. Moreover various protocols enable automatic assignment of IP addresses within a particular network. For instance, in accordance with the Dynamic Host Configuration Protocol (DHCP), network administrators may manage a network centrally and automate the assignment of Internet Protocol (IP) addresses in an organization's network. More particularly, using the Internet's set of protocols (TCP/IP), each device that is capable of connecting to the Internet needs a unique IP address. When an organization sets up its computer users with a connection to the Internet, an IP address must be assigned to each machine. Without DHCP, the IP address must be entered manually at each computer and, if computers move to another location in another part of the network, a new IP address must be entered. DHCP allows a network administrator to supervise and distribute IP addresses from a central point and automatically sends a new IP address when a computer is plugged into a different location within the network.

DHCP uses the concept of a "lease" or amount of time that a given IP address will be valid for a computer. The lease time can vary depending on how long a user is likely to require the Internet connection at a particular location. DHCP is particularly useful in education and other environments where users change frequently. Using very short leases, DHCP can dynamically reconfigure networks in which there are more computers than there are available IP addresses. Thus, DHCP supports static addresses for computers containing Web servers that need a permanent IP address.

Although DHCP functions in a static environment, the assignment of a new IP address each time a computer changes its location within a network is far from ideal within a mobile environment. More particularly, when a mobile node roams to a new location within a network, it would be desirable for the node to maintain its home address. However, provisions have not been made for a node that wishes to maintain a single IP address when it changes its location within a network using DHCP. Moreover, a node that is not mobile enabled cannot currently change its location within a network using DHCP and still maintain its assigned IP address.

It is possible to provide Internet services via a wireless link for mobile users who attach to a network via a connection such as a DHCP connection, even where the node does not support Mobile IP. Specifically, a proxy device may implement Mobile IP on behalf of a node that does not support Mobile IP functionality. One such proxy device is the access point (AP). An Access Point (AP) may be defined as the center point in an all-wireless network or serves as a connection point between a wired and a wireless network. Multiple APs can be placed throughout a facility to give users with WLAN adapters the ability to roam freely throughout an extended area while maintaining uninterrupted access to all network resources.

Patent application Ser. No. 10/080,995, entitled "METHODS AND APPARATUS FOR SUPPORTING PROXY MOBILE IP REGISTRATION IN A WIRELESS LOCAL AREA NETWORK," discloses a system for communicating subnet addresses of gateways (e.g., Home Agents) that support APs in the network. When an AP receives a data packet, the AP may compare the data packet (e.g., source address) with the AP information for one or more APs to determine whether to send a registration request on behalf of the node. More particularly, the AP determines from the source address whether the node is located on a subnet identical to a subnet of the AP. If the node is located on the subnet of the AP, no Mobile IP service is required on behalf of the node. However, when it is determined from the source address that the node is not located on the subnet identical to the subnet of the Access Point, the AP composes and sends a mobile IP registration request on behalf of the node. For instance, the mobile IP registration request may be composed using the gateway associated with the "home" AP (e.g., having a matching subnet) as the node's Home Agent.

Specifically, an authoritative access point (AAP) maintains access point network subnet addresses and access point information for multiple functioning access points (APs) (i.e., active APs) and sends updates to the functioning APs regarding additions or other modifications to the continually changing access point information. For instance, when an AP goes offline, the access point information for that AP will be removed from the set of access point information, and notification of this removal is sent to other APs so that the local copy of the AP information may be similarly updated. As another example, when an AP comes online, it will send its AP information to the AAP. The AAP will store the AP information and provide this new AP information to other "active" APs. The AP information preferably includes an IP address, and is associated with an AP subnetwork (subnet) and a gateway (Home Agent or Foreign Agent address). This information may be stored in a "subnet mapping table" by each AP and AAP.

If there are no network problems, all subnet mapping tables maintained for each AP across the network will be identical. Unfortunately, there may be network problems which result in differences between the access point information that is maintained by each AAP. For instance, if part of the network crashes while an AP comes online, the information maintained by the AAPs may become out of sync. As a result, the access point information distributed to the active APs may also be out of sync. Therefore, an AP may not be able to perform proxy registration for all Mobile Nodes.

In view of the above, it would be desirable if the information distributed to individual APs could be maintained consistently across the AAPs.

SUMMARY OF THE INVENTION

The present invention provides proxy mobile IP support for a node that changes its location within a network. This is accomplished, in part, through the communication between access points within the network. Through the use of such communication, access point information associated with multiple APs may be maintained, enabling registration and de-registration of the node with a Home Agent to be initiated by an Access Point. Once registered with the Home Agent, packets may be forwarded by the Home Agent to the Foreign Agent. Moreover, the access point may also redirect packets sent by the node to the Foreign Agent, enabling the redirected packets to be sent to the appropriate destination by the Foreign Agent.

In accordance with one aspect of the invention, mobility of a node that does not support Mobile IP is enabled through synchronization of access point information (e.g., subnet mapping tables) among authoritative access points (AAPs). In accordance with one embodiment, an authoritative access point (AAP) maintains access point information for all functioning access points (APs) and sends updates for all additions or other modifications to the continually changing access point information to other AAPs. This is accomplished by sending a copy of its local subnet mapping table to the other AAPs. The AAPs receiving the subnet mapping table then update their subnet mapping tables corresponding to the received subnet mapping table.

In accordance with another aspect of the invention, an AAP obtains the subnet mapping table of other AAPs. If there are additional items in the received subnet mapping table that are not in the receiving AAP's subnet mapping table, the AAP will add that AP entry to its table after confirming that the AP identified in that entry is still alive. If the AAP determines that the AP identified in the entry is not reachable, the information from that entry will not be added to the AAP's subnet mapping table.

In accordance with yet another aspect of the invention, an AAP receiving a subnet mapping table checks the currency of each entry of the received subnet mapping table. If the information in an entry of the received subnet mapping table is determined to be current, the AAP updates its information in its subnet mapping table to reflect the information in the entry. For instance, the AAP may ascertain whether the AP identified in the entry is alive. As another example, the AAP may ascertain whether the Home Agent identified in the entry is alive. The AAP may then add or remove information and/or entry(s) in its subnet mapping table as appropriate. In addition, the AAP may notify one or more additional AAPs to update their subnet mapping tables in accordance with the ascertained information.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

An invention is described herein that enables a node (e.g., a node that does not implement the Mobile IP protocol) to roam to various Foreign Agents within a network including a DHCP supported network. This is accomplished, in part, through the use of control messages sent between the access points within the network. For purposes of the following discussion, the term "mobile node" will be used to refer to a mobile node implementing the Mobile IP protocol while the term "node" will be used to refer to a node that does not implement the Mobile IP protocol.

Figure 1:
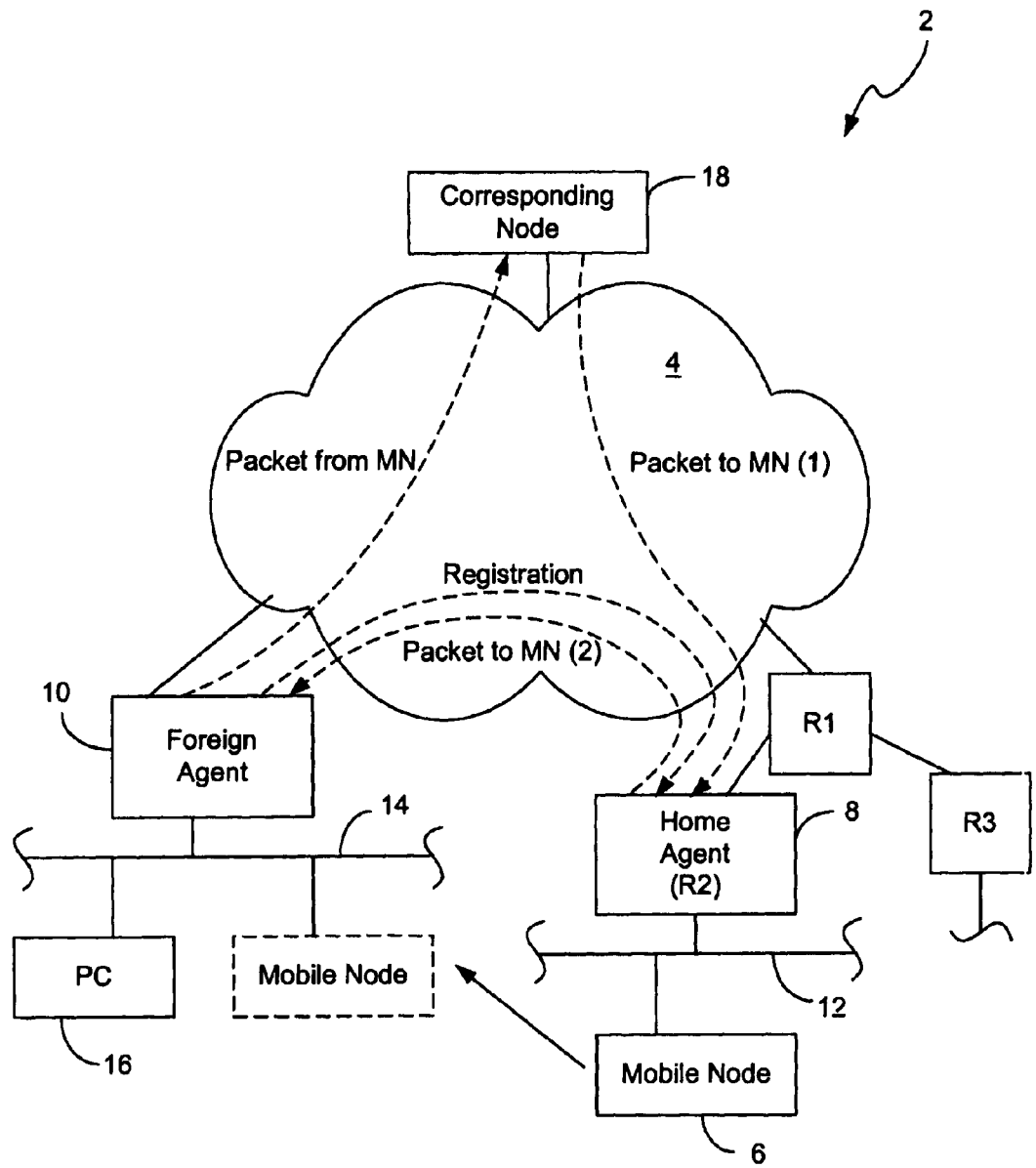
FIG. 1 is a diagram illustrating a Mobile IP network segment and associated environment.
Figure 2:
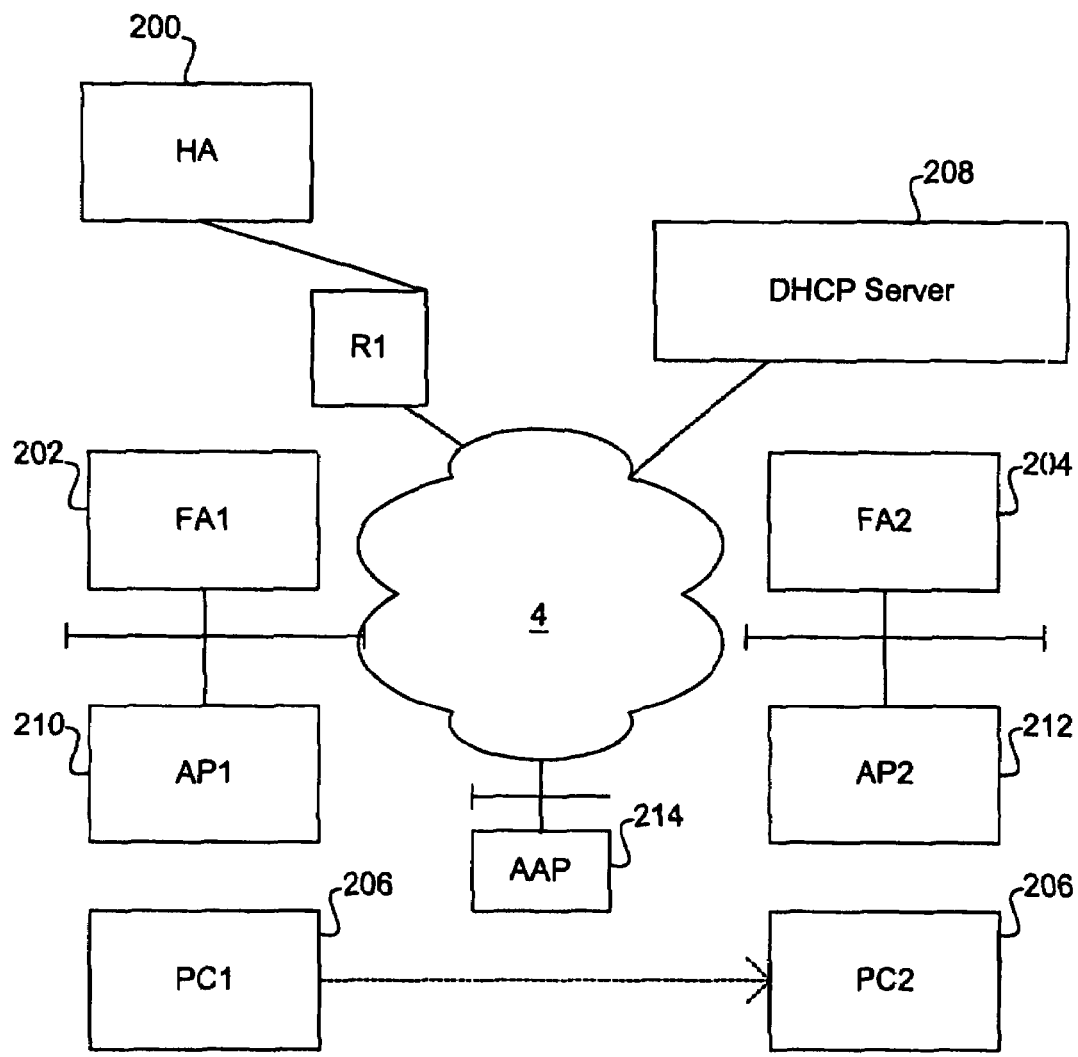
FIG. 2 is a diagram illustrating a system including multiple access points.

FIG. 2 is a block diagram illustrating a system in which the present invention may be implemented. In the following description, the present invention is implemented in a wireless network. However, although the present invention is described as being implemented in a wireless network, the present invention may also be implemented in a non-wireless network. As shown, a node 206 may wish to roam from its Home Agent 200 to a first Foreign Agent 202. Similarly, once attached to the first Foreign Agent 202, the node 206 may again wish to roam to a second Foreign Agent 204. Although the node 206 may have an assigned IP address, when the node 206 roams, it is preferable for the node to maintain this assigned IP address. For instance, although a DHCP server 208 typically dynamically assigns a new IP address to a node when its location within a network has changed, it is preferable to maintain the IP address originally assigned to the node by the DHCP server 208.

In a wireless network, Access Points 210 and 212 are coupled to the Foreign Agents 202 and 204 respectively. By way of example, in a wireless network, the Access Points 210 and 212 may have an antenna and receiver for receiving packets. As yet another example, the Access Points 210 and 212 may designate connection points in a non-wireless network. Typically, a mobile node implementing Mobile IP registers and de-registers with its Home Agent through the registration process. However, according to various embodiments of the invention disclosed in patent application Ser. No. 10/080,995, entitled "METHODS AND APPARATUS FOR SUPPORTING PROXY MOBILE IP REGISTRATION IN A WIRELESS LOCAL AREA NETWORK,", registration is initiated by the Access Point on behalf of the Mobile IP node. Similarly, de-registration may be initiated by the Access Point on behalf of the roaming node. For instance, node 206 that has roamed to the first Foreign Agent 202 is registered with the node's Home Agent 200 when the first Access Point 210 composes and sends a registration request packet via the first Foreign Agent 202. Thus, the first Foreign Agent's visitor table and the Home Agent's mobility binding table are updated to indicate that the node has roamed to the first Foreign Agent 202. When the node 206 roams to the second Foreign Agent 204, the node 206 is registered with the Home Agent via the second Foreign Agent 204 (e.g., by one of the Access Points 210, 212, either of the Foreign Agents 202, 204 and/or the Home Agent 200). In other words, the first Foreign Agent 202 updates its visitor table to reflect the movement of the node 206. Similarly, the Home Agent's mobility binding table is updated to reflect the movement of the node 206 to the second Foreign Agent 204. Thus, the appropriate entry in the first Foreign Agent's visitor table and the Home Agent's mobility binding table may be deleted. A new entry is then entered in the Home Agent's mobility binding table and the second Foreign Agent's visitor table upon completion of registration of the mobile node with the Home Agent. Alternatively, the visitor table may be maintained and updated by the Access Point.

As described in patent application Ser. No. 10/080,995, entitled "METHODS AND APPARATUS FOR SUPPORTING PROXY MOBILE IP REGISTRATION IN A WIRELESS LOCAL AREA NETWORK," access point control messages are used by an authoritative access point (AAP) and one or more access points to communicate information about the respective access points. More particularly, access point information may be transmitted among the access points so that each access point may store a local copy of the access point information. This access point information may be used to determine the Home Agent information (e.g., IP address) in order to start proxy Mobile IP service. Specifically, access point information may be used to ascertain the node's Home Agent address).

In accordance with one embodiment, multiple APs maintain identical local copies of a subnet mapping table that stores AP information for the multiple APs. More specifically, when an AP comes online, it is considered "active" and provides its AP information to other active APs. This exchange and distribution of AP information is preferably performed via an authoritative AP (AAP) responsible for receiving AP information from a newly active AP and distributing that received AP information to other active APs. Similarly, the authoritative AP also provides the newly active AP with AP information from the other active APs. Thus, the AAP and all other APs maintain identical subnet mapping tables. From the AP information in the subnet mapping table, an AP may ascertain the node's Home Agent address, thereby enabling the AP to compose and send a Mobile IP registration request on behalf of the node.

Since the access point information maintained by each AAP may be out of sync with the access point information maintained by other AAPs due to instability in the network, the present invention supports synchronization of the access point information (e.g., subnet mapping table) maintained by the AAPs. In this manner, accurate and up-to-date access point information may be transmitted to APs associated with the AAP(s).

Figures 3, 4:
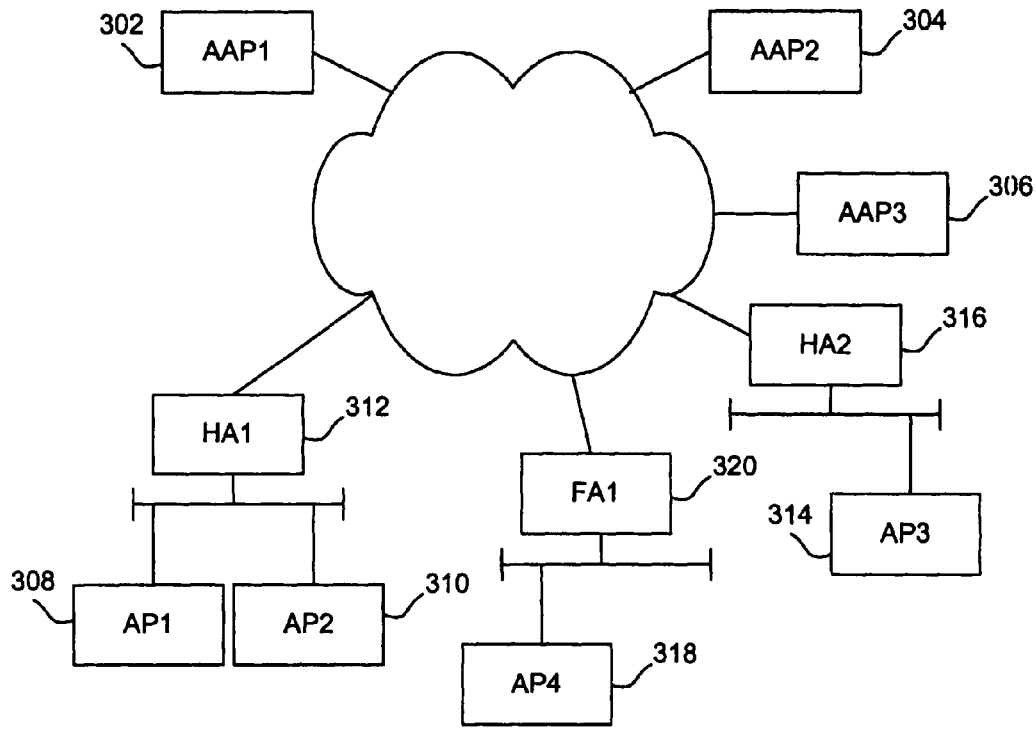
FIG. 3 is a diagram illustrating a system in which multiple Authoritative Access Points communicate among one another to synchronize information among the Authoritative Access Points in accordance with various embodiments of the invention.
FIG. 4 is a diagram illustrating an exemplary subnet mapping table that may be maintained by an AP such as an Authoritative AP in accordance with various embodiments of the invention.

FIG. 3 is a diagram illustrating a system in which multiple Authoritative Access Points communicate among one another to synchronize information among the Authoritative Access Points in accordance with various embodiments of the invention. In this example, the set of AAPs includes three AAPs, AAP1 302, AAP2 304, and AAP3 306. However, alternate numbers of AAPs may be used. In this example, Access Points AP1 308 and AP2 310 are coupled to Home Agent HA1 312, AP3 314 is coupled to Home Agent HA2 316, and AP4 318 is coupled to Foreign Agent FA1 320.

All "subordinate" APs are configured with a mechanism for determining the AAP with which it is to communicate, and that will be responsible for updating the AP as well as responsible for receiving updates from the AP. For instance, the APs may be statically configured with the identity (e.g., IP address) of the AAP. Alternatively, the APs may dynamically ascertain the identity of the AAP. For instance, the AAP may be the first AP to be powered on, which signals the other APs that it is the AAP. When each AP powers up, it sends AP information to the AAP. For instance, the access point information preferably identifies an access point subnet and a gateway (e.g., Home Agent IP address), and may also include a subnet mask and an IP address for the access point. In order to keep track of all active APs, the AAP may update a list of active access points to include the newly active access point. The list of active access points identifies one or more active access points. For instance, the list may include an IP address for each of the active access points. In addition, the access point information is stored. As will be described in further detail below with reference to FIG. 4, the access point information for one or more active access points may be stored in a subnet mapping table.

In addition to updating its own subnet mapping table, the AAP sends the access point information for the newly active AP to all other active APs identified in the active AP list, as well as any additional AP information associated with other active APs from the subnet mapping table to the newly active AP. As described above, the active AP list may identify one or more active access points. Upon receipt of the access point information, the active APs store the received AP information. In addition, it is important to note that the newly active AP also stores its own AP information (e.g., in its subnet mapping table) as well as that received from the AAP. For instance, the AP information may be stored in a subnet mapping table such as that described below with reference to FIG. 4. In this manner, all APs (including the AAP) maintain consistent AP information, thereby enabling each access point to correctly obtain the Home Agent information needed to perform Mobile IP registration for the node. In addition, as will be described in further detail below with reference to FIGS. 5 and 6, in order to ensure that the access point information is synchronized among the APs and AAPs, the AAP will send its access point information (e.g., subnet mapping table) to other AAPs. The AAPs each will then update their corresponding subnet mapping table as appropriate as described in further detail below with reference to FIG. 6.

In order for a proxy device such as an AP to function properly, it needs to have information about the Home Agents in the network. As described above, each AAP (and AP) preferably maintains its own subnet mapping table. FIG. 4 is a diagram illustrating an exemplary subnet mapping table that may be maintained by an AAP in accordance with various embodiments of the previous invention. As shown, a subnet mapping table 402 may store a plurality of entries, each storing AP information for one or more access points. As shown, each entry specifies a subnet mask 404 that may be used to ascertain a subnet associated with a gateway 406 (e.g., Home Agent IP address). The subnet is therefore associated with one or more APs that are coupled to the subnet. An IP address associated with one or more APs supported by the Home Agent are specified at 408. By maintaining the IP address of the APs, the AAP may send messages such as an UPDATE message (e.g., ADD or REMOVE packet) to a specified AP. In addition, the subnet mapping table identifies the number of access points 410 that the Home Agent supports. Thus, when the number of access points 410 is zero for a particular Home Agent, the entry may then be deleted from the subnet mapping table when the Home Agent is not available.

Figure 5:
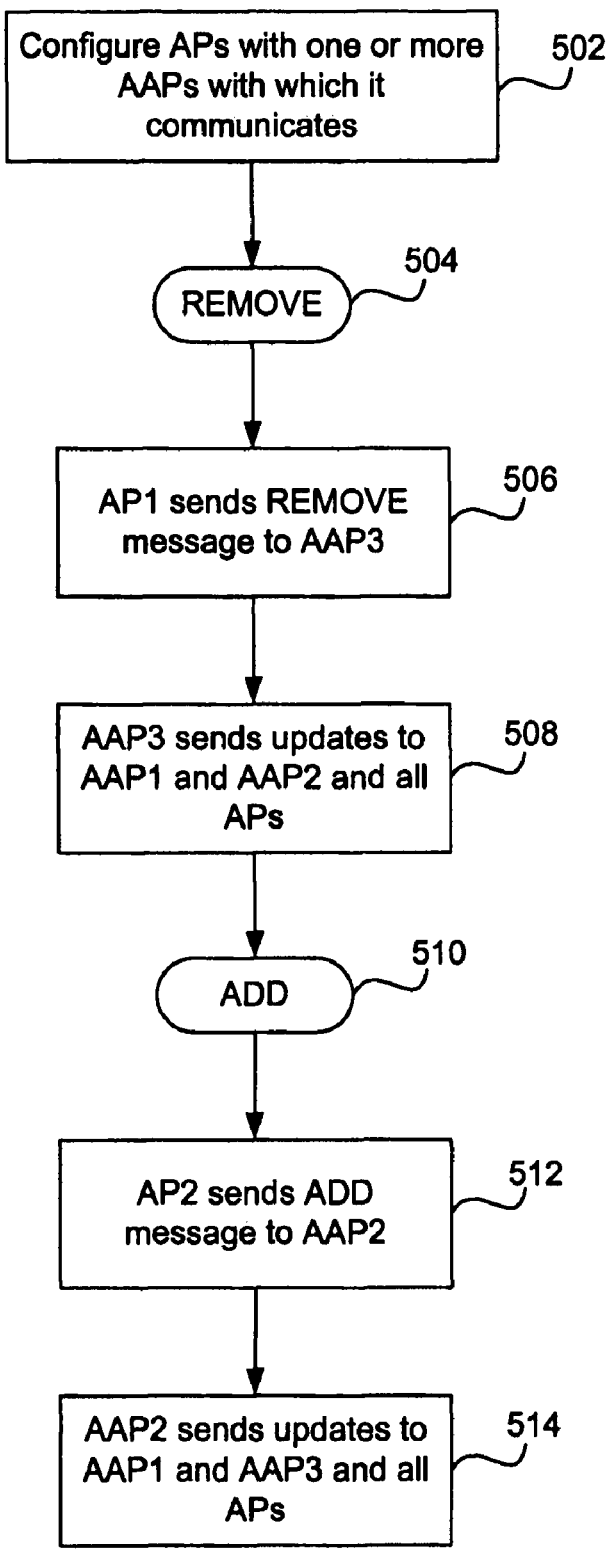
FIG. 5 is a process flow diagram illustrating a method of communicating AP information among the Authoritative APs in response to an update such as an ADD or REMOVE message received from an AP in accordance with various embodiments of the invention.

FIG. 5 is a process flow diagram illustrating a method of communicating AP information among the Authoritative APs in response to an update such as an ADD or REMOVE message received from an AP in accordance with various embodiments of the invention. Each AP is initially configured with one or more AAPs with which it communicates at block 502. When an AP shuts down, it sends a REMOVE message at 504 requesting that its IP address be removed from the subnet mapping table at block 506. In this example, AP1 sends a REMOVE message to AAP3. The AAP3 then sends updates to other AAPs AAP1 and AAP2, and all other APs at block 508. For instance, the updates may include a subnet mapping table transmitted in a data packet. Upon receipt of the data packet, the AAP adds the received AP information from the AP subnet mapping table to its own local subnet mapping table, as necessary (e.g., if the information is new).

As another example, when an AP powers up, it sends an ADD packet 510 to the appropriate AAP. For instance, as shown at block 512, AP2 sends an ADD message to AAP2 including its IP address that indicates that its IP address should be added to the subnet mapping table. AAP2 then sends the subnet mapping table to other AAPs AAP1 and AAP3, and all other APs at block 514. The receiving AAPs AAP1 and AAP3 then update their corresponding subnet mapping tables as appropriate.

Although the above examples indicate that ADD and REMOVE packets are sent by APs, they may also be sent between AAPs. Moreover, other control packets such as SYNC, ALIVE, GET, DATA, and ACK may also be sent.

While the AAPs are capable of sending updates to other AAPs, there is no guarantee that the information transmitted by an AAP is more current than the receiving AAP. In other words, it is possible that the receiving AAP's subnet mapping table is more current than the sending AAP's subnet mapping table. Moreover, it is possible that only a portion of a subnet mapping table is most current. Thus, it is desirable to synchronize the subnet mapping tables maintained by the AAPs.

Figure 6:
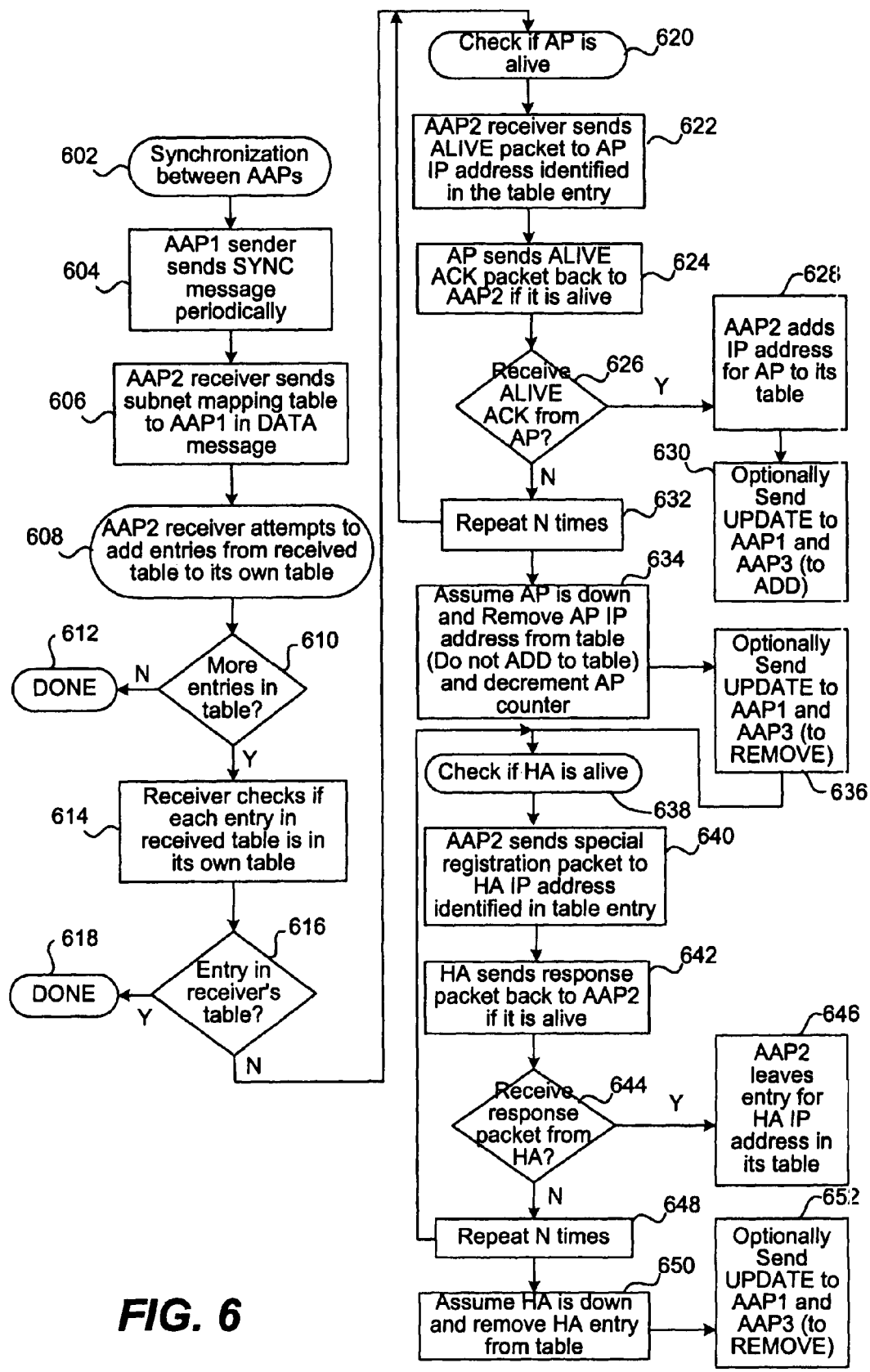
FIG. 6 is a process flow diagram illustrating a method of synchronizing subnet mapping tables including subnet information among the Authoritative Access Points in accordance with various embodiments of the invention.

FIG. 6 is a process flow diagram illustrating a method of synchronizing subnet mapping tables including subnet information among the Authoritative Access Points in accordance with various embodiments of the invention. Synchronization 602 is performed when a second AAP sends AP information such as a subnet mapping table or portion thereof to a first AAP. This may be accomplished in response to a SYNC message sent by the first AAP to one or more other AAPs that are configured on the first AAP as shown at block 604. The SYNC message may be sent periodically or several times if there is no response to the first SYNC message. When the SYNC message is received by one or more AAPs, those AAPs that are accessible (e.g., ALIVE or ACTIVE) will send back their subnet mapping table to the initiating AAP. In this example, the AAP2 receiver of the SYNC message sends its subnet mapping table to AAP1 at block 606. This may be accomplished by transmitting the subnet mapping table in a DATA packet.

The AAP2 receiver then determines whether its data or the AAP 1 sender's data is more current. This is preferably performed on a per-entry basis. In accordance with one embodiment, the AAP2 receiver attempts to add entries from the received subnet mapping table to its own subnet mapping table as shown at blocks 608-618. For each entry in the received table, AAP2 checks if there are more entries at block 610. If there are no more entries in the received table to process, the process is completed at block 612. Otherwise, AAP2 checks if each entry in the received table is in its own table at block 614. For instance, AAP2 may determine whether the AP IP address is stored in its subnet mapping table. This may be accomplished by attempting to try to add the entry to its own subnet mapping table. If the ADD command is unsuccessful, the entry is already present in the subnet mapping table of AAP2. If the entry is in AAP2's table at block 616, the process ends at block 618.

If the entry is not in AAP2's table (e.g., the ADD command is successful), AAP2 checks if the AP is alive at blocks 620-636. Specifically, AAP2 sends an ALIVE packet to the AP IP address identified in the sending AAP's subnet mapping table entry at block 622. If the AP is active, it sends an ALIVE ACK packet back to AAP2 at block 624, which includes its current subnet address and Home Agent information (e.g., IP address). The AAP will then use this latest information and enter it into its existing subnet mapping table. Specifically, if AAP2 receives an ALIVE ACK packet from the AP at block 626, AAP2 adds the IP address for the AP to its table at block 628, as well as the additional information such as subnet address and Home Agent IP address. In addition, it increments the number of Access Points in the entry. It may then send an UPDATE packet to the remaining AAP(s) at block 630. Specifically, the UPDATE may include an ADD packet indicating that the AP IP address should be added to the subnet mapping table of the receiving AAP(s). If there is no response to the first ALIVE packet, one or more additional ALIVE packets may be sent (e.g., at an appropriate timeout). If at block 628, AAP2 does not receive an ALIVE ACK from the AP for a specified number of times (e.g., corresponding to the number of ALIVE packets sent) as shown at block 632, it is assumed that the AP is down and the AP IP address is removed from the subnet mapping table at block 634 and the counter for the number of APs for the corresponding Home Agent is decremented and stored in the entry of the subnet mapping table. An UPDATE may then be sent to other AAP(s) including AAP1 and AAP3 at block 636, which may include a REMOVE packet indicating that the AP IP address should be removed from the subnet mapping table of the receiving AAP(s).

If there is no response to the ALIVE packets sent to the AP and the number of APs (e.g., AP counter) for that Home Agent has decreased to zero, the Home Agent is queried to determine whether it is up, at block 638. Specifically, the AP sends a registration request message with an incorrect SPI and associated key to see if the Home Agent is alive. If AAP2 receives a response from the Home Agent at block 644, AAP2 leaves the entry for the HA IP address in its table at block 646. Otherwise, one or more additional special registration packets may be sent as shown at block 648. If a response packet is not received, it is assumed that the Home Agent is down at block 650 and the Home Agent entry is removed from the subnet mapping table. An UPDATE may then be sent at block 652 to other configured AAP(s) including AAP1 and AAP3 to remove the Home Agent entry. For instance, the UPDATE may include a REMOVE packet indicating that the Home Agent entry should be removed from the subnet mapping table.

The synchronization operation described above with reference to FIG. 6 will be performed by each AAP at a regular configurable interval. In this manner multiple AAPs coordinate with one another to keep the subnet mapping table in sync such that every AP in the entire network will have the same copy of the table.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Access Points of this invention may be implemented in specially configured routers or servers, as well as Cisco Aironet Access Points, available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 7:
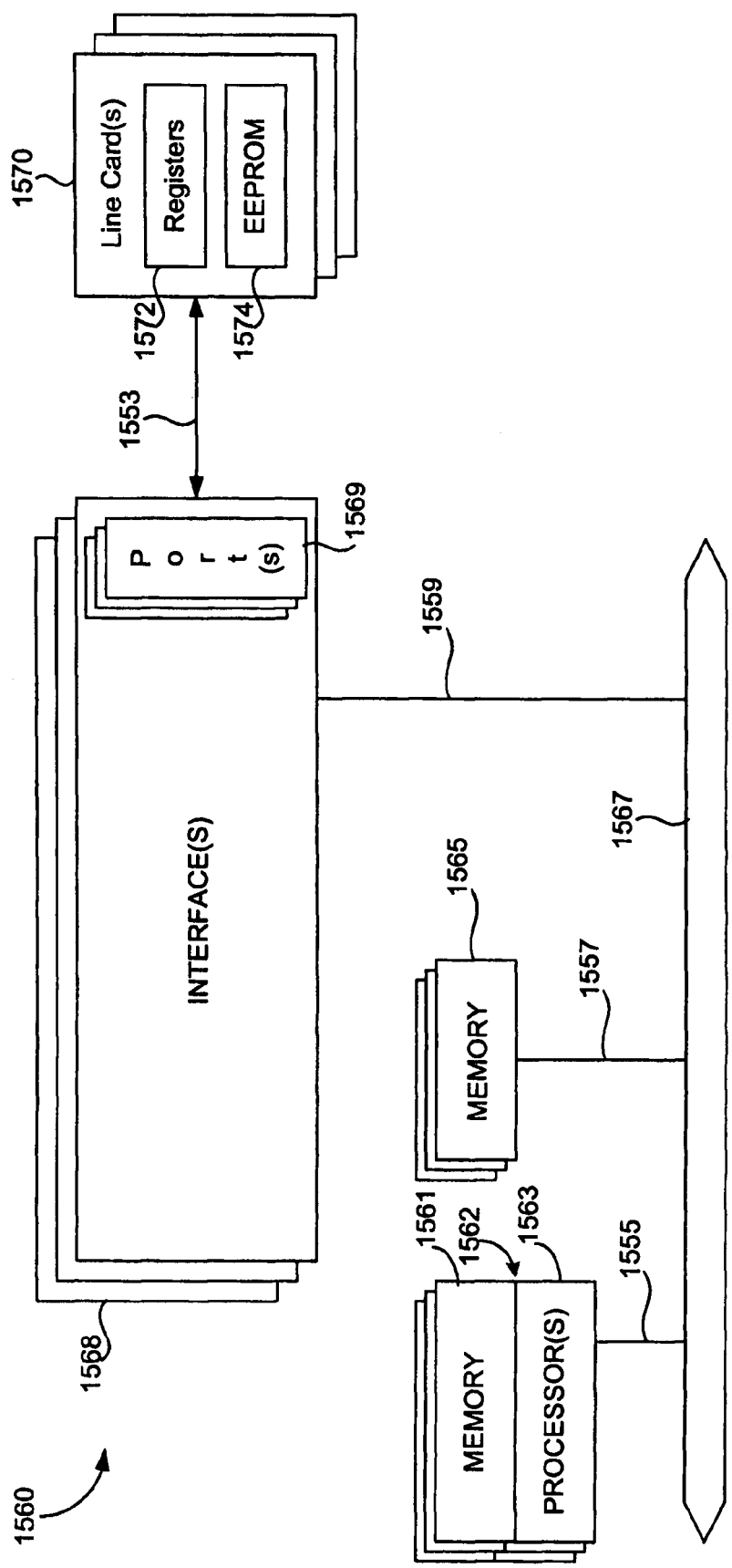
FIG. 7 is a block diagram of a network device that may be configured to implement aspects of the present invention.

Referring now to FIG. 7, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although not shown, various removable antennas may be used for further increase range and reliability of the access points. In addition, radio transmit power e.g., 1, 5, 20, 30, 50, and 100 mW) on the Cisco Aironet—Access Point Series is configurable to meet coverage requirements and minimize interference. In addition, a Cisco Aironet AP can be configured as a redundant hot standby to another AP in the same coverage area. The hot-standby AP continually monitors the primary AP on the same channel, and assumes its role in the rare case of a failure of the primary AP.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described access points, other entities used to tunnel packets to mobile nodes on remote network segments can be used as well. For example, routers, bridges or other less intelligent packet switches may also employ the standby protocol of this invention. Moreover, although the present invention is useful for nodes that do not support Mobile IP, the invention may also be applicable for nodes that support Mobile IP. Moreover, the present invention may be applicable in a network supported by various protocols such as DHCP. In addition, each AP need not maintain local copies of the subnet mapping table. Rather, a centralized subnet mapping table may be maintained (e.g., by the AAP). In addition, control packets such as the ADD, GET, and REMOVE packets may be sent to multiple APs rather than solely to the AAP. The invention is also applicable to synchronize two or more sets of tables that include IP addresses of hosts that may be going up or down. The synchronization then keeps the tables up to date. Thus, the above-described embodiments are merely illustrative, and information may be stored in multiple tables rather than in a single table.

Accordingly, the present embodiments are to be considered as illustrative and not restrictive, and the invention is not to be limited to the details given herein, but may be modified within the scope and equivalents of the appended claims.

What is claimed is:

1. In a first authoritative access point, a method of synchronizing two or more subnet mapping tables maintained by two or more authoritative access points, comprising:
   receiving one or more subnet mapping tables from one or more authoritative access points; and
   updating a first subnet mapping table maintained by the first authoritative access point corresponding to the one or more subnet mapping tables received from the one or more authoritative access points;
   wherein the first authoritative access point and the one or more authoritative access points each maintains access point information for a plurality of active access points and is responsible for sending information to the plurality of active access points regarding modifications to the access point information;
   wherein each of the subnet mapping tables that have been received identifies one or more access points; and
   determining whether information in the received subnet mapping table is current;
   wherein updating is performed such that the first subnet mapping table includes the information from the received subnet mapping table that is determined to be current.

2. The method as recited in claim 1, further comprising:
   notifying one or more additional authoritative access points to update their corresponding subnet mapping table corresponding to the updates performed on the first subnet mapping table.

3. The method as recited in claim 1, wherein receiving one or more subnet mapping tables is performed in response to a SYNC message sent by the first authoritative access point to the one or more authoritative access points.

4. The method as recited in claim 1, wherein updating comprises:
   attempting to add an entry in the received subnet mapping table to the first subnet mapping table.

5. The method as recited in claim 1, wherein updating comprises:
   adding an entry in the received subnet mapping table to the first subnet mapping table.

6. The method as recited in claim 1, wherein updating comprises:
   determining whether an access point identified in an entry in the received subnet mapping table is alive;
   when it is determined that the access point identified in the entry in the received subnet mapping table is alive, updating the first subnet mapping table such that the first subnet mapping table includes an IP address associated with the access point; and
   when it is determined that the access point identified in the entry in the received subnet mapping table is not alive, updating the first subnet mapping table such that the first subnet mapping table does not include the IP address associated with the access point.

7. The method as recited in claim 1, further comprising:
   determining whether an access point identified in an entry in the received subnet mapping table is alive;
   when it is determined that the access point identified in the entry in the received subnet mapping table is alive, sending an ADD message to one or more additional authoritative access points indicating that the IP address should be added to their corresponding subnet mapping tables; and
   when it is determined that the access point identified in the entry in the received subnet mapping table is not alive, sending a REMOVE message to one or more additional authoritative access points indicating that the IP address should be removed from their corresponding subnet mapping tables.

8. The method as recited in claim 6, further comprising:
   when it is determined that the access point identified in the entry in the received subnet mapping table is not alive, determining whether a Home Agent identified in the entry is alive.

9. The method as recited in claim 1, further comprising:
   determining whether a Home Agent identified in an entry in the received subnet mapping table is alive;
   when it is determined that the Home Agent identified in the entry is not alive, updating the first subnet mapping table such that the first subnet mapping table does not include an entry associated with the Home Agent; and
   when it is determined that the Home Agent identified in the entry is alive, updating the first subnet mapping table such that the first subnet mapping table includes an entry associated with the Home Agent.

10. The method as recited in claim 1, further comprising:
    determining whether a Home Agent identified in an entry in the received subnet mapping table is alive;
    when it is determined that the Home Agent identified in the entry is not alive, sending a REMOVE message to one or more additional authoritative access points to remove an entry associated with the Home Agent from their corresponding subnet mapping table.

11. The method as recited in claim 1, further comprising:
    determining whether a Home Agent identified in an entry in the received subnet mapping table is alive;
    when it is determined that the Home Agent identified in the entry is not alive, sending a REMOVE message to one or more additional authoritative access points to remove an entry associated with the Home Agent from their corresponding subnet mapping table.

12. The method as recited in claim 1, wherein each subnet mapping table comprises a plurality of entries, each of the entries including a Home Agent address, subnet mask, and one or more IP addresses of one or more Access Points that the Home Agent supports.

13. The method as recited in claim 12, wherein each of the plurality of entries further indicates a number of Access Points that the Home Agent supports.

14. The method as recited in claim 13, wherein updating the first subnet mapping table comprises:
    removing a Home Agent entry in the first subnet mapping table when the number of Access Points is zero and it is determined that the Home Agent is down.

15. The method as recited in claim 13, further comprising:
    decrementing the number of Access Points that the Home Agent supports when an IP address associated with an Access Point is removed from the entry in the first subnet mapping table.

16. The method as recited in claim 1, wherein determining whether information in the received subnet mapping table is current comprises:
    querying an Access Point identified in an entry in the received subnet mapping table to determine whether the Access Point is alive.

17. The method as recited in claim 1, wherein determining whether information in the received subnet mapping table is current comprises:
    querying a Home Agent identified in an entry in the received subnet mapping table to determine whether the Home Agent is alive.

18. The method as recited in claim 6, wherein determining whether an access point identified in an entry in the received subnet mapping table is alive comprises:
  sending an ALIVE packet to the access point identified in the entry; and
  receiving an ALIVE ACK packet from the access point that indicates a subnet address and Home Agent address associated with the access point.

19. The method as recited in claim 18, further comprising:
  updating an entry in the first subnet mapping table to include the subnet address, Home Agent address, and IP address associated with the access point.

20. The method as recited in claim 19, further comprising:
  incrementing the number of access points within the entry of the first subnet mapping table.

21. A computer-readable medium storing thereon computer-readable instructions for synchronizing two or more subnet mapping tables maintained by two or more authoritative access points in a first authoritative access point, comprising:
  instructions for receiving one or more subnet mapping tables from one or more authoritative access points; and
  instructions for updating a first subnet mapping table maintained by the first authoritative access point corresponding to the one or more subnet mapping tables received from the one or more authoritative access points;
  wherein the first authoritative access point and the one or more authoritative access points each maintains access point information for a plurality of active access points and is responsible for sending information to the plurality of active access points regarding modifications to the access point information;
  wherein each of the subnet mapping tables that have been received identifies one or more access points;
  determining whether the access points in each of the subnet mapping tables are alive;
  wherein updating is performed in accordance with whether the access points in each of the subnet mapping tables are determined to be alive.

22. A first authoritative access point adapted for synchronizing two or more subnet mapping tables maintained by two or more authoritative access points, comprising:
  means for receiving one or more subnet mapping tables from one or more authoritative access points; and
  means for updating a first subnet mapping table maintained by the first authoritative access point corresponding to the one or more subnet mapping tables received from the one or more authoritative access points;
  wherein the first authoritative access point and the one or more authoritative access points each maintains access point information for a plurality of active access points and is responsible for sending information to the plurality of active access points regarding modifications to the access point information;
  wherein each of the subnet mapping tables that have been received identifies one or more access points;
  determining whether information in the received subnet mapping table is current;
  wherein updating is performed such that the first subnet mapping table includes the information from the received subnet mapping table that is determined to be current.

23. A first authoritative access point adapted for synchronizing two or more subnet mapping tables maintained by two or more authoritative access points, comprising:
  a processor; and
  a memory, at least one of the processor or the memory being adapted for:
  receiving one or more subnet mapping tables from one or more authoritative access points; and
  updating a first subnet mapping table maintained by the first authoritative access point corresponding to the one or more subnet mapping tables received from the one or more authoritative access points;
  wherein the first authoritative access point and the one or more authoritative access points each maintains access point information for a plurality of active access points and is responsible for sending information to the plurality of active access points regarding modifications to the access point information;
  wherein each of the subnet mapping tables that have been received identifies one or more access points;
  determining whether the access points in each of the subnet mapping tables are alive;
  wherein updating is performed in accordance with whether the access points in each of the subnet mapping tables are determined to be alive.

24. In a first authoritative access point, a method of synchronizing two or more subnet mapping tables maintained by two or more authoritative access points, comprising:
  receiving one or more subnet mapping tables from one or more authoritative access points; and
  updating a first subnet mapping table maintained by the first authoritative access point corresponding to the one or more subnet mapping tables received from the one or more authoritative access points;
  wherein the first authoritative access point and the one or more authoritative access points each maintains access point information for a plurality of active access points and is responsible for sending information to the plurality of active access points regarding modifications to the access point information;
  wherein each of the subnet mapping tables that have been received identifies one or more access points;
  wherein updating is performed such that the first subnet mapping table incorporates at least a portion of the information from the received subnet mapping table.

25. The method as recited in claim 24, wherein each subnet mapping table comprises a plurality of entries, each of the entries including a Home Agent address and one or more IP addresses of one or more Access Points that the Home Agent supports.

26. The method as recited in claim 1, further comprising:
  determining whether a Home Agent identified in an entry in the received subnet mapping table is alive;
  when it is determined that the Home Agent identified in the entry is not alive, removing an entry associated with the Home Agent from the first subnet mapping table.

27. In a first authoritative access point, a method of synchronizing two or more subnet mapping tables maintained by two or more authoritative access points, comprising:
  receiving one or more subnet mapping tables from one or more authoritative access points; and
  updating a first subnet mapping table maintained by the first authoritative access point corresponding to the one or more subnet mapping tables received from the one or more authoritative access points;
  wherein the first authoritative access point and the one or more authoritative access points each maintains access point information for a plurality of active access points and is responsible for sending information to the plu rality of active access points regarding modifications to the access point information;

wherein each of the subnet mapping tables that have been received identifies one or more access points;

determining whether the access points in each of the subnet mapping tables are alive;

wherein updating is performed in accordance with whether the access points in each of the subnet mapping tables are determined to be alive.

* * * * *